(12) United States Patent
Zhang et al.

(10) Patent No.: US 11,982,060 B1
(45) Date of Patent: May 14, 2024

(54) BARRIER STRUCTURE FOR BEARING HIGH-ENERGY IMPACT AND CONSTRUCTION METHOD THEREOF

(71) Applicants: Railway Construction Research Institute, China Academy of Railway Science Group Co., Ltd., Beijing (CN); China Academy of Railway Sciences Group Co., Ltd., Beijing (CN)

(72) Inventors: Yufang Zhang, Beijing (CN); Yong Yao, Chengdu (CN); Kun Yuan, Beijing (CN); Junli Wan, Beijing (CN); Wenchao Zhang, Chengdu (CN); Jian Li, Beijing (CN); Mengjia Liu, Beijing (CN); Zhongmin Yang, Beijing (CN); Zhenhua Yin, Beijing (CN); Guozhuang Song, Beijing (CN); Yafei Xuan, Beijing (CN); Peng Zhang, Beijing (CN); Gongming Chen, Beijing (CN); Changheng Chen, Beijing (CN)

(73) Assignees: Railway Construction Research Institute, China Academy of Railway Science Group Co., Ltd., Beijing (CN); China Academy of Railway Sciences Group Co. , Ltd., Beijing (CN)

( * ) Notice: Subject to any disclaimer, the term of this patent is extended or adjusted under 35 U.S.C. 154(b) by 0 days.

(21) Appl. No.: 18/489,852

(22) Filed: Oct. 19, 2023

(30) Foreign Application Priority Data

Nov. 10, 2022 (CN) .......................... 202211408549.5

(51) Int. Cl.
*E01F 7/04* (2006.01)
(52) U.S. Cl.
CPC .................................. *E01F 7/045* (2013.01)
(58) Field of Classification Search
CPC ....................................................... E01F 7/045
See application file for complete search history.

(56) References Cited

U.S. PATENT DOCUMENTS

| 2017/0121919 A1* | 5/2017 | Orgnoni | ................. B21F 27/02 |
| 2021/0302268 A1* | 9/2021 | Albertelli | ................ G01L 1/127 |

FOREIGN PATENT DOCUMENTS

| CN | 106087785 A | * 11/2016 | .............. E01F 7/045 |
| CN | 206070542 U | 4/2017 | |
| CN | 112411407 A | * 2/2021 | .............. E01F 7/045 |

(Continued)

*Primary Examiner* — Matthew R McMahon

(57) ABSTRACT

A barrier structure for bearing a high-energy impact and construction method thereof are provided. The barrier structure includes a supporting pile array arranged between two opposite mountain slope surfaces. The supporting pile array is arranged in a straight line and includes two or more supporting piles. The two or more supporting piles are fixed at a lower part of a mountain. A barrier net is connected to the two or more supporting piles. The barrier net passes through the supporting pile array and extends to the two opposite mountain slope surfaces. The barrier net is fixed on the two opposite mountain slope surfaces. Pull plates are disposed on the two opposite mountain slope surfaces, and one side of each of the pull plates is fixed to a corresponding slope surface of the two opposite mountain slope surfaces through reverse prestressed anchor cables.

8 Claims, 2 Drawing Sheets

(56) References Cited

FOREIGN PATENT DOCUMENTS

| CN | 112431143 | A | * | 3/2021 | ............. | E01F 7/045 |
| CN | 113389162 | A |   | 9/2021 |   |   |
| CN | 217460346 | U | * | 9/2022 |   |   |
| CN | 115559234 | A | * | 1/2023 |   |   |
| CN | 218713149 | U | * | 3/2023 |   |   |
| KP | 20040052681 | A | * | 6/2004 |   |   |
| KR | 20050023383 | A | * | 3/2005 | ............. | E01F 7/045 |
| KR | 20060135582 | A | * | 12/2006 | ............. | E01F 7/045 |

* cited by examiner

BARRIER STRUCTURE FOR BEARING HIGH-ENERGY IMPACT AND CONSTRUCTION METHOD THEREOF

TECHNICAL FIELD

The disclosure relates to the field of mountain protection technology, in particular to a barrier structure for bearing a high-energy impact and construction method thereof.

BACKGROUND

In the protection engineering of large-scale geological disasters such as highways, railways, mines, and municipal facilities, corresponding control measures will be given by considering the aspects of avoidance, blocking, and protection. Specifically, active and passive barrier net structures have been applied.

A Chinese patent with the publication number CN207714344U provides a passive protection net for a cutting side slope at complex mountain areas, the passive protection net is disposed at a bottom of the cutting side slope, and the passive protection net includes a steel column concrete foundation, H section steel columns, anchor ropes, anchor rods, a steel wire rope net, steel wire grids, an upper supporting rope, and a lower supporting rope. The steel wire rope net is hung between the upper supporting rope and the lower supporting rope. The steel wire grids are hung at an inside of the steel wire rope net. The passive protection net includes the following advantages: the passive protection net for the cutting side slope at complex mountain areas has low cost, convenient construction, high construction security, convenient preparation and transportation, thereby reducing time for a project and investment and obtaining a high-efficient economic purpose.

At the same time, researchers also research and develop the design of steel wire rope nets. A Chinese patent application with the publication number CN102261078A provides a steel wire rope net, an active protective net including the steel rope net, and a rockfall protective fence including the steel wire rope net. The steel wire rope net is a mesh-like component woven from steel wire ropes. A node where the steel wire ropes intersect is tightly twined with low-carbon steel wires and the low-carbon steel wires are coated with Zn—Al-alloy for an anti-corrosion treatment, thereby forming a mesh node connector of the steel wire rope net. The steel wire rope net of the patent is labor-saving, material-saving, and durable in use, and the steel wire rope net has a long service life and a high strength. The steel wire rope net can be applied to the production of active protective nets and rockfall protective fences, greatly improving the strength and service life of active protective nets and rockfall protective fences.

However, previous research can only be applied to scenes with general energy level impacts. For geological hazards such as high level collapse and rockfall, the impact energy is high and the harm is serious. At present, there is a lack of research related to protective barrier structures for impact energy exceeding 5000 kilojoules (kJ) in the world.

With the development of highways and railways constructions in difficult and complex mountainous areas, extreme weather and earthquakes occur frequently and result in serious geological hazards during the construction and operation of linear engineering. In difficult and complex environments, high level collapses and rockfalls occur frequently with high-energy impacts. The protection levels of traditional active and passive protective nets are difficult to meet the current protection needs, and there is an urgent need to research and design barrier net protection structures suitable for high-energy impacts and harsh environments.

Therefore, the research of a barrier net protection structure suitable for a high-energy impact is an urgent issue for those skilled in the art to achieve the application in harsh environments with frequent high level collapses and high-energy impacts.

SUMMARY

In order to overcome the above shortcomings, the disclosure provides a barrier structure for bearing a high-energy impact and construction method thereof, the barrier structure is disposed between two mountain slope surfaces, and the barrier structure includes a supporting pile array arranged in a straight line. A barrier net is connected between supporting piles of the supporting pile array. Two sides of the barrier net are fixed to the two mountain slope surfaces through pull plates. A height of the barrier net, a yield elongation rate of a material of the barrier net, and a fracture elongation rate of the material of the barrier net are set. The barrier net of the disclosure has a higher protective energy level than traditional flexible blocking nets and is easy to maintain. The disclosure is flexible and suitable for a high-energy impact falling from a large height.

In a first aspect, the disclosure provides a barrier structure for bearing a high-energy impact, and the barrier structure includes a supporting pile array arranged between two opposite mountain slope surfaces. The supporting pile array is arranged in a straight line and includes two or more supporting piles, and a preset distance between each two adjacent supporting piles of the two or more supporting piles is preset.

The two or more supporting piles are fixed at a lower part of a mountain, a barrier net is connected between the two or more adjacent supporting piles, the barrier net passes through the supporting pile array and extends to the two opposite mountain slope surfaces, and the barrier net is fixed on the two opposite mountain slope surfaces.

Each of the two opposite mountain slope surfaces is provided with pull plates thereon, one side of each of the pull plates is fixed to a corresponding mountain slope surface of the two opposite mountain slope surfaces through reverse prestressed anchor cables, and the other side of the pull plate is connected to the barrier net for fixing the barrier net.

A height of the barrier net is not less than 6 meters (m), a yield elongation rate of a material of the barrier net is not less than 0.2%, and a fracture elongation rate of the material of the barrier net is not less than 20%.

The supporting pile array plays a role in fixing the barrier net, and the barrier net has a high yield strength and a high elongation rate in a whole process that a rockfall impacts on the barrier net and stops on the barrier net. A main energy conversion during the whole process is as follows: gravitational potential energy of the rockfall is converted into kinetic energy, the rockfall impacts on the barrier net, the barrier net extends to do work to absorb impact energy of the rockfall due to a good elongation rate of the barrier net, and the rockfall stops on the barrier net. The barrier net passes through the supporting pile array and is anchored on the pull plates, the setting of the pull plates facilitates the disassembly and replacement of the barrier net when the performance of the barrier net is weakened or even damaged due to the high-energy impact.

In an embodiment, the barrier net is a grid-like structure including transverse steel strands and longitudinal steel strands, the transverse steel strands are connected to the pull plates, a spacing between each two adjacent transverse steel strands of the transverse steel strands is not greater than 0.3 m.

In an embodiment, the spacing between each two adjacent transverse steel strands satisfies a following relationship:

$$h \leq n/(\sqrt[3]{V}+1)$$

where h represents the spacing between each two adjacent transverse steel strands, n represents the number of the transverse steel strands, and V represents a volume of the rockfall.

The number of the transverse steel strands satisfies following relationships:

$$MgH \leq n(W_1+W_2)$$

$$W_1 = F_2 \times L \times \Delta_1 - F_1 \times L \times \Delta_0$$

$$W_2 = F_2 \times L \times (\Delta 2 - \Delta_1)$$

where M represents a mass of the rockfall, H represents a height difference from a location where the rockfall falls to a position where the rockfall collides with the barrier net, $W_1$ represents a work done during an elastic stage of a single transverse steel strand of the transverse steel strands, $W_2$ represents a work done during a plastic stage of the single transverse steel strand, $F_1$ represents a preload applied to the single transverse steel strand, $F_2$ represents a yield critical force of the single transverse steel strand, L represents a length of the single transverse steel strand, $\Delta_0$ represents a preload stretch rate of the single transverse steel strand, $\Delta_1$ represents a yield elongation of a single transverse steel strand, and $\Delta_2$ represents a plastic deformation elongation rate of the single transverse steel strand.

The gravitational potential energy of the rockfall is converted into kinetic energy and the rockfall impacts the barrier net. Based on the properties of the material of the barrier net, the spacing between adjacent horizontal steel strands is designed to be suitable for the high-energy impact.

In an embodiment, a ratio of the number of reverse prestressed anchor cables connected to each of the pull plates to the number of the transverse steel strands connected to each of the pull plates is not less than 0.3, and a ratio of a height of each of the pull plates above the ground to a height of each of the pull plates below the ground is not greater than 7.4.

In an embodiment, at a top of the barrier net, at least two transverse steel strands of the transverse steel strands are bound through T-shaped fasteners to form a top transverse steel strand and fixed to the longitudinal steel strands. At a bottom of the barrier net, at least two transverse steel strands of the transverse steel strands are bound through T-shaped fasteners to form a bottom transverse steel strand and fixed to the longitudinal steel strands. Other transverse steel strands of the barrier net intersect with the longitudinal steel strands one by one to form intersection parts, and each of the intersection parts is fixed through a cross-shaped fastener.

In an embodiment, one end of each of the T-shaped fasteners is a clamp casing configured to bind the top transverse steel strand or the bottom transverse steel strand. The clamp casing is fixed by bolts disposed on two sides of the top transverse steel strand or bolts disposed on two sides of the bottom transverse steel strand. The other end of each of the T-shaped fasteners is a U-shaped fork ear. A front side of the U-shaped fork ear is hinged with the clamp casing, and a rear side of the U-shaped fork ear is fixed to a single longitudinal steel strand of the longitudinal steel strands through a wedge-shaped component.

Specifically, the wedge-shaped component includes a locking nut, a pressing nut, a wedge-shaped card, and a wedge-shaped card casing. The wedge-shaped card casing is clamped and fixed with the single longitudinal steel strand. The locking nut and the pressing nut are configured to fix the wedge-shaped card casing and the single longitudinal steel strand. The wedge-shaped card casing is configured to wrap the wedge-shaped card and clamp the single longitudinal steel strand.

Both the cross-shaped fastener and the T-shaped fastener are made of materials with high yield strengths and high uniform stretch rates. By considering energy impacts at the top and bottom of the barrier net (also referred to the top of the barrier net and the bottom of the barrier net), the transverse steel strands and the longitudinal steel strands are fixed to make the barrier net resistant to the high-energy impact.

In an embodiment, each of the supporting piles is provided prestressed anchor cables thereon, one end of each of the prestressed anchor cables is fixedly connected to a side wall of a corresponding supporting pile of the supporting piles, and the other end of each of the prestressed anchor cables is fixed at the lower part of the mountain; and prestressed anchor cables connected to the corresponding supporting pile are located in a same plane and are perpendicular to the barrier net.

Each of the supporting piles is provided with vertical reinforcement bars, and the vertical reinforcement bars are evenly disposed in the supporting pile at an equal spacing.

Each of the supporting piles includes an upper portion, a middle portion, and a bottom portion. A height ratio of the upper portion:the middle portion:the bottom portion is (0.8~4.2):(4.8~5.2):(2.8~3.2). A spacing ratio of a spacing of two adjacent prestressed anchor cables of the prestressed anchor cables disposed on the upper portion:a spacing of two adjacent prestressed anchor cables of the prestressed anchor cables disposed on the middle portion:a spacing of two adjacent prestressed anchor cables of the prestressed anchor cables disposed on the bottom portion is (0.9~1.1):(1.4~1.6):(2.9~3.1).

In an embodiment, a calculation formula of the number of the vertical reinforcement bars is expressed as follows:

$$m \geq \frac{\tau}{f_y B_s (h_0 - a'_s)}$$

where m represents the number of the vertical reinforcement bars, τ represents a bending moment of each of the supporting piles, $f_y$ represents a yield strength of each of the vertical reinforcement bars, $B_s$ represents a sectional area of a single vertical reinforcement bar of the vertical reinforcement bars, $h_0$ represents a sectional height of each of the supporting piles, and $a_s'$ represents a thickness of a protective layer of each of the supporting piles.

In an embodiment, a calculation formula of the bending moment of each of the supporting piles is expressed as follows:

$$\tau = EI \frac{2x_n - x_{n+1} - x_{n-1}}{h_1^2}$$

in the formula, each of the supporting piles is divided into n equal parts with a length of $h_1$ from top to bottom, $\tau$ represents the bending moment of each of the supporting pile, E represents an elastic modulus of each of the supporting piles, 1 represents a sectional moment of inertia of each of the supporting piles, and x represents a horizontal deflection of each of the supporting piles.

The stability of the supporting piles plays a crucial role in the stability of the barrier structure. Based on the analysis of the characteristics of the rockfall impact, the prestressed anchor cables are arranged with different spacings and the number of prestressed anchor cables is adjusted to ensure the stability of the supporting piles.

In a second aspect, the disclosure provides a construction method for the barrier structure for bearing the high-energy impact, and the construction method includes:

based on arrangement of the support pile array, excavating pile wells for the support piles at the lower part of the mountain to complete pouring of the support piles;

drilling holes on the two opposite mountain slope surfaces for placing the reverse prestressed anchor cables, and fixing the pull plates on the two opposite mountain slope surfaces; and preparing the barrier net, connecting the barrier net to the supporting piles and the pull plates disposed on the two opposite mountain slope surfaces, thereby completing construction of the barrier structure for bearing the high-energy impact.

The barrier structure for bearing the high-energy impact and construction method thereof provided by the disclosure has the following beneficial effects.

1. The barrier structure is disposed between two opposite mountain slope surfaces, and the barrier structure includes a supporting pile array arranged in a straight line. A barrier net is connected between supporting piles of the supporting pile array. Two sides of the barrier net are fixed to the two opposite mountain slope surfaces through pull plates. A height of the barrier net, a yield elongation rate of a barrier net material, and a fracture elongation rate of the barrier net material are set. The barrier net of the disclosure has a higher protective energy level than traditional flexible blocking nets and is easy to maintain. The disclosure is flexible and suitable for the high-energy impact falling from a large height.

2. By setting the support piles, the pull plates, and the barrier net, the barrier structure of the disclosure has a higher protective energy level than traditional passive protective nets. By setting the height of the barrier net to at least 6 m, a protective height of the barrier net can be 3~5 times that of traditional passive protective nets. Since the pull plates are connected to the barrier net, a function of replacing the barrier net after the rockfall impact can be achieved.

3. By reasonably calculating the spacing and number of the transverse steel strands, it is possible to ensure that the barrier structure can achieve high energy impact protection under conditions of the height of the barrier net being not less than 6 m, the yield elongation rate of the barrier net material being not less than 0.2%, and the fracture elongation rate of the barrier net material being not less than 20%.

4. Based on the analysis of the characteristics of the rockfall impact, the prestressed anchor cables are arranged with different spacings and the number of prestressed anchor cables is adjusted to ensure the stability of the supporting piles.

DESCRIPTION OF REFERENCE NUMERALS

1—supporting pile; 2—barrier net; 3—pull plate; 31—reverse prestressed anchor cable; 4—T-shaped fastener; 41—clamp casing; 42—U-shaped fork ear; 43—wedge-shaped component; 431—locking nut; 432—pressing nut; 433—wedge-shaped card; 434—wedge-shaped card casing; 5—cross-shaped fastener; 6—prestressed anchor cable.

DETAILED DESCRIPTION OF EMBODIMENTS

In order to better understand the above technical solutions, the following will describe the above technical solutions in detail with reference to drawings and specific embodiments. It should be understood that the described embodiments are only a part of embodiments of the disclosure, not all of the embodiments. Based on the embodiments of the disclosure, all other embodiments obtained by those of ordinary skill in the art without creative work are within the scope of the disclosure.

Terms used in the embodiments of the disclosure are solely for the purpose of describing the specific embodiments, and are not intended to limit the disclosure. Singular forms of "one", "said", and "the" used in the embodiments of the disclosure and the claims are also intended to indicate majority forms, unless the context clearly indicates other meanings. "multiple" generally indicates at least two features.

It should also be noted that terms "include", "comprise", or any other similar terms are intended to indicate non-exclusive inclusion, so that a product or device that includes a series of elements not only includes these elements, but also other elements which are not explicitly listed, or also include elements inherent in the product or device. Without further restrictions, an element limited by the statement "includes a . . . " does not exclude the presence of other same elements in the product or the device including the element.

Figure 1:
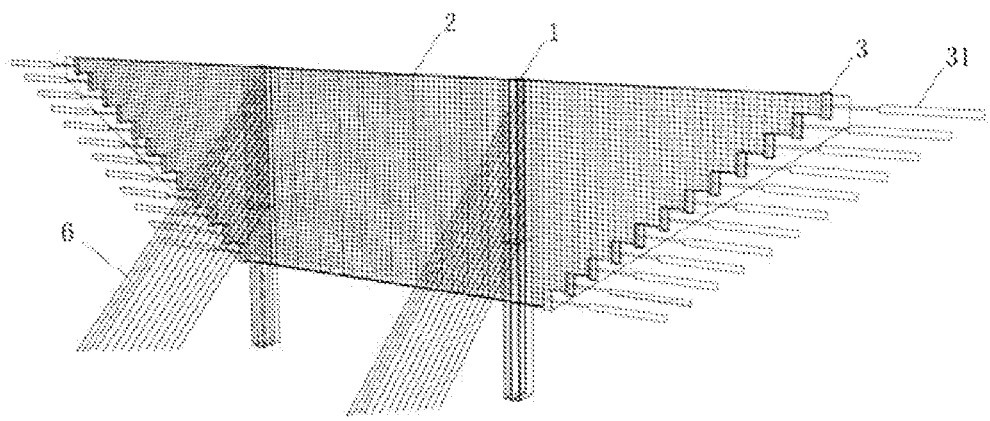
FIG. 1 illustrates a schematic diagram of a barrier structure for bearing a high-energy impact provided by the disclosure.

As shown in FIG. 1, a barrier structure for bearing a high-energy impact is provided in an embodiment of the disclosure. The barrier structure includes a supporting pile array arranged between two opposite mountain slope surfaces. The supporting pile array is arranged in a straight line and includes two or more supporting piles 1, and a preset distance between each two adjacent supporting piles 1 of the two or more supporting piles 1 is preset.

All supporting piles 1 (also referred to as the two or more supporting piles) of the supporting pile array are fixed at a lower part of a corresponding mountain. A barrier net 2 is connected between the two adjacent supporting piles. The barrier net 2 passes through the supporting pile array and extends to the two opposite mountain slope surfaces, and the barrier net 2 is fixed on the two opposite mountain slope surfaces.

Each of the two opposite mountain slope surfaces is provided with pull plates 3 thereon, one side of each of the pull plates 3 is fixed to a corresponding mountain slope surface of the two opposite mountain slope surfaces through reverse prestressed anchor cables 31, and the other side of the pull plate 3 is connected to the barrier net 2 for fixing the barrier net 2.

A height of the barrier net 2 is not less than 6 m, a yield elongation rate of a material of the barrier net 2 is not less than 0.2%, and a fracture elongation rate of the material of the barrier net 2 is not less than 20%.

In the embodiment, the supporting piles 1 are disposed at the lower part of the mountain, the barrier net 2 passes through the supporting piles 1 and is fixed by the pull plates 3 disposed on the two opposite mountain slope surfaces, thereby making the barrier structure capable of bearing the high-energy impact generated by the rockfall falling from a high position on the mountain. Specifically, the height of the barrier net 2 is not less than 6 m; the yield elongation rate of the material of the barrier net 2 is not less than 0.2%; and the fracture elongation rate of the material of the barrier net is not less than 20%. The barrier net 2 of the disclosure has a higher protective energy level than traditional passive protective nets, and thus the barrier structure of the disclosure is suitable for the high-energy impact. A protective height of the barrier net 2 of the disclosure is 3~5 times that of traditional passive protective nets, which greatly improves a protective effect to the mountain.

When the bander net 2 is used for bearing the high-energy impact, the structure and parameters of the barrier net 2 are set based on an actual effect. The barrier net 2 may be a cross-shaped structure including transverse steel strands and longitudinal steel strands. The transverse steel strands are connected to the pull plates 3, and a spacing between each two adjacent transverse steel strands of the transverse steel strands is not greater than 0.3 m.

The barrier net of the disclosure is made of a new type of steel strand with a high yield strength and a high uniform elongation rate. The spacing between each two transverse steel strands of the barrier net 2 is determined based on impact energy, and the spacing between each two longitudinal steel strands is determined based on the spacing between each two transverse steel strands. By determining the spacing between each two transverse steel strands, it is possible to avoid the rockfall passing through gaps between the strands due to a large spacing. In addition, in order to fully consider a corresponding relationship between the spacing between the transverse steel strands and the rockfall, calculation and analysis can be conducted to ensure that the spacing between adjacent transverse steel strands in the embodiment meets the protective requirements for the rockfall in a corresponding scene. Specifically, the spacing between each two adjacent transverse steel strands satisfies a following relationship:

$$h \leq n/(\sqrt[3]{V}+1)$$

where h represents the spacing between each two adjacent transverse steel strands, n represents the number of the transverse steel strands, and V represents a volume of the rockfall.

When the impact energy of the rockfall falling obliquely (including rolling, sliding, and bouncing) from a mountain slope is studied, the impact energy of the rockfall falling obliquely is generally converted into energy of the rockfall falling freely based on previous calculations and experience values in actual scenes; in other words, the rockfall falls at a vertical height of a position on the mountain slope where the rockfall falls.

The new type of steel strand has a high yield strength and a high uniform elongation rate, and a deformation process of the steel strand is mainly divided into the following three stages: elastic stage, plastic stage, and failure stage. When an initial preload $F_1$ is applied to a transverse steel strand, the transverse steel strand of the barrier net 2 is in the elastic stage; when the transverse steel strand of the barrier net 2 is impacted by the rockfall, the transverse steel strand of the barrier net 2 transforms from the elastic stage to the plastic stage, that is, the initial preload $F_1$ is transformed to a yield critical force $F_2$; and when the transverse steel strand of the barrier net 2 is impacted by the rockfall and the yield critical force $F_2$ is applied to the transverse steel strand, plastic deformation occurs on the transverse steel strand of the barrier net 2. The barrier structure suitable for the high-energy impact of the disclosure ensures that the maximum impact energy of the rockfall can only make the transverse steel strand of the barrier net reach the plastic stage.

A main energy conversion during a whole process that the rockfall impacts on the barrier net 2 and stops on the barrier net 2 is as follows: gravitational potential energy of the rockfall is converted into kinetic energy the rockfall impacts on the barrier net 2, the barrier net 2 extends to do work to absorb the impact energy of the rockfall due to a good elongation rate of the barrier net 2, and the rockfall stops on the barrier net 2.

During the use of the barrier net 2 in the embodiment, it is necessary to keep the barrier net 2 in the elastic stage and the plastic stages as much as possible. Therefore, the number of transverse steel strands n in the barrier structure satisfies following relationships:

$$MgH \leq n(W_1+W_2)$$

$$W_1 = F_2 \times L \times \Delta_1 - F_1 \times L \times \Delta_0$$

$$W_2 = F_2 \times L \times (\Delta_2 - \Delta_1)$$

where M represents a mass of the rockfall, H represents a height difference from a position where the rockfall falls to a position where the rockfall collides with the barrier net, $W_1$ represents a work done during an elastic stage of a single transverse steel strand of the transverse steel strands, $W_2$ represents a work done during a plastic stage of the single transverse steel strand, $F_1$ represents a preload applied to the single transverse steel strand, $F_2$ represents a yield critical force of the single transverse steel strand, L represents a length of the single transverse steel strand, $\Delta_0$ represents a preload stretch rate of the single transverse steel strand, $\Delta_1$ represents a yield elongation of a single transverse steel strand, and $\Delta_2$ represents a plastic deformation elongation rate of the single transverse steel strand.

Different values of the preload $F_1$ can be applied to different application scenarios. Generally, the appropriate adjustment of the value of the preload has little effect on the spacing adjustment of the transverse steel strands. The volume value of the rockfall and the mass value of the rockfall are set based on historical data in the application scenario, and it is also necessary to perform positive or conservative calculations on threshold values that the barrier structure can bear.

By fully considering the rockfall and mountain conditions at a position where the barrier structure is set, and considering the different parameters of the elastic and plastic stages of the transverse steel strands based on their own characteristics, the number of transverse steel strands that should be installed is finally determined. Based on the number of transverse steel strands and the situation of the rockfall, the spacing between two adjacent transverse steel strands is finally obtained. The barrier net 2 can be disposed according to the spacing between the transverse steel strands, thereby achieving high-energy protection against the rockfall.

The number of longitudinal steel strands and the spacing between two adjacent longitudinal steel strands can be set based on the spacing between each two transverse steel strands and the sizes of the rockfall in the historical data in the application scenario.

After determining the spacing between two adjacent transverse steel strands, it is necessary to make the transverse steel strands pass through the support piles 1 and fix the transverse steel strands on the mountain. In the embodiment, when the transverse steel strands are fixed on the mountain, the transverse steel strands are fixed by setting the pull plates 3.

The pull plates 3 of the embodiment are fixed to the mountain through reverse prestressed anchor cables 31, and each of the pull plates 3 can anchor multiple transverse steel strands. In order to fix and pull multiple transverse steel strands by the pull plates 3, the number of reverse prestressed anchor cables 31 needs to be set. In an actual application scenario, a ratio of the number of reverse prestressed anchor cables 31 connected to each of the pull plates 3 to the number of the transverse steel strands connected to each of the pull plates 3 is not less than 0.3, and a ratio of a height of each of the pull plates 3 above the ground to a height of the pull plate 3 below the ground is not greater than 7.4.

By setting the number of the reverse prestressed anchor cables 31, the number of the transverse steel strands, and a thickness of each of the pull plates 3, it can be ensured that the pull plates 3 always have good fixation and tension effects on the transverse steel strands. A function of the pull plate 3 is to replace the transverse steel strands after the transverse steel strands are impacted by the rockfall. The structures and sizes of the pull plates 3 are designed based on forces acting on the barrier net 2 and anchoring forces of the reverse prestressed anchor cables 31, and the design of the structures and sizes of the pull plates 3 includes reinforcement bar configuration and sectional sizes.

After the transverse steel strands are fixed to the pull plates 3 on the mountain, the longitudinal steel strands are fixed on the transverse steel strands. During a process of fixing the longitudinal steel strands, the longitudinal steel strands can be fixed through corresponding structures. In actual application scenarios, there are two situations of fixing the longitudinal steel strands to the transverse steel strands. One is that the longitudinal steel strands are fixed to the transverse steel strands at a top and a bottom of the barrier net 2, and the other is that the longitudinal steel strands are fixed to other transverse steel strands except for the transverse steel strands at the top and bottom of the barrier net (also referred to as the top transverse steel strand and the bottom transverse steel strand).

Figure 2:
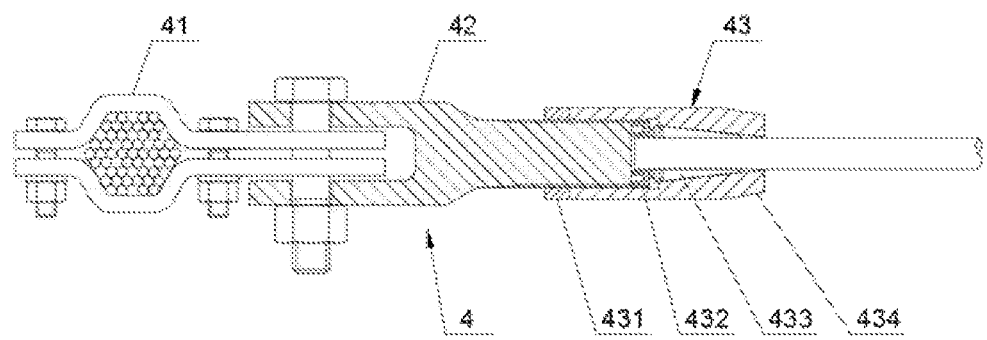
FIG. 2 illustrates a structural schematic diagram of a T-shaped fastener provided in an embodiment of the disclosure.
Figure 3:
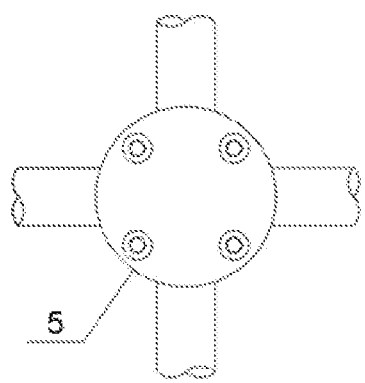
FIG. 3 illustrates a structural schematic diagram of a cross-shaped fastener provided in an embodiment of the disclosure.

Specifically, as shown in FIG. 2 and FIG. 3, in the embodiment, at a top of the barrier net 2, at least two transverse steel strands of the transverse steel strands are bound through T-shaped fasteners 4 to form a top transverse steel strand and fixed to the longitudinal steel strands; at a bottom of the barrier net 2, at least two transverse steel strands of the transverse steel strands are bound through T-shaped fasteners 4 to form a bottom transverse steel strand and fixed to the longitudinal steel strands; and other transverse steel strands of the barrier net 2 intersect with the longitudinal steel strands one by one to form intersection parts, and each of the intersection parts is fixed through a cross-shaped fastener 5. Preferably, seven transverse steel strands are bound at the top of the barrier net 2 to form the top transverse steel strand, and seven transverse steel strands are bound at the bottom of the barrier net 2 to form the bottom transverse steel strand.

Specifically, one end of each of the T-shaped fasteners 4 is a clamp casing 41 configured to bind the top transverse steel strand or the bottom transverse steel strand. The clamp casing 41 is fixed by bolts disposed on two sides of the top transverse steel strand or bolts disposed on two sides of the bottom transverse steel strand. The other end of each of the T-shaped fasteners 4 is a U-shaped fork ear 42. A front side of the U-shaped fork ear 42 is hinged with the clamp casing 41. A rear side of the U-shaped fork ear 42 is fixed to a single longitudinal steel strand of the longitudinal steel strands through a wedge-shaped component 43. The wedge-shaped component 43 may include a locking nut 431, a pressing nut 432, a wedge-shaped card 433, and a wedge-shaped card casing 434. The wedge-shaped card casing 434 is clamped and fixed with the single longitudinal steel strand. The locking nut 431 and the pressing nut 432 are configured to fix the wedge-shaped card casing 434 and the single longitudinal steel strand. The wedge-shaped card casing 434 is configured to wrap the wedge-shaped card 433 and clamp the single longitudinal steel strand.

In order to improve the protective effect of the barrier net 2 in the embodiment, the top and the bottom of the barrier net 2 can be fixed by bundling multiple transverse steel strands into the clamp casing 41 to fix the longitudinal steel strands. The barrier net 2 has a rotational space after the transverse steel strands and the longitudinal steel strands are fixed through the clamp casing 41 hinged with the U-shaped fork ear 42.

When the wedge-shaped components 43 is used to fix the longitudinal steel strand, one end of the longitudinal steel strand is fixed by the pressing nut 432. By matching the locking nut 431 with the wedge-shaped card casing 434, the wedge-shaped card 433 is compressed, thereby making the wedge-shaped card 433 be clamped and fixed with the longitudinal steel strand.

The cross-shaped fastener 5 of the embodiment is also made of a new material with a high yield strength and a high uniform elongation rate. The cross-shaped fastener 5 can include a fastener substrate and two fastener cover plates fixed on two sides of the fastener substrate. The two sides of the fastener substrate are respectively provided with mutually perpendicular first grooves, and the fastener cover plate is provided with second grooves. The first and second grooves are mirror symmetrical structures, the first grooves are matched with the second grooves to form channels that accommodates the transverse and longitudinal steel strands.

When the transverse and longitudinal steel strands are fixed through the cross-shaped fastener 5, the transverse and longitudinal steel strands are respectively placed in the first grooves on two sides of the fastener substrate. Then, the two fastener cover plates are covered with the two sides of the fastener substrate to match the first and second grooves. The fastener cover plates and the fastener substrate are fixed through bolts to complete the fixation of the transverse and longitudinal steel strands.

Both the cross-shaped fastener 5 and the T-shaped fastener 4 are made of a material with high yield strength and a high uniform tensile rate. By considering the energy impact at the top and bottom of the barrier net 2, the transverse and longitudinal steel strands are fixed to make the barrier net 2 resistant to the high-energy impact.

Figure 4:
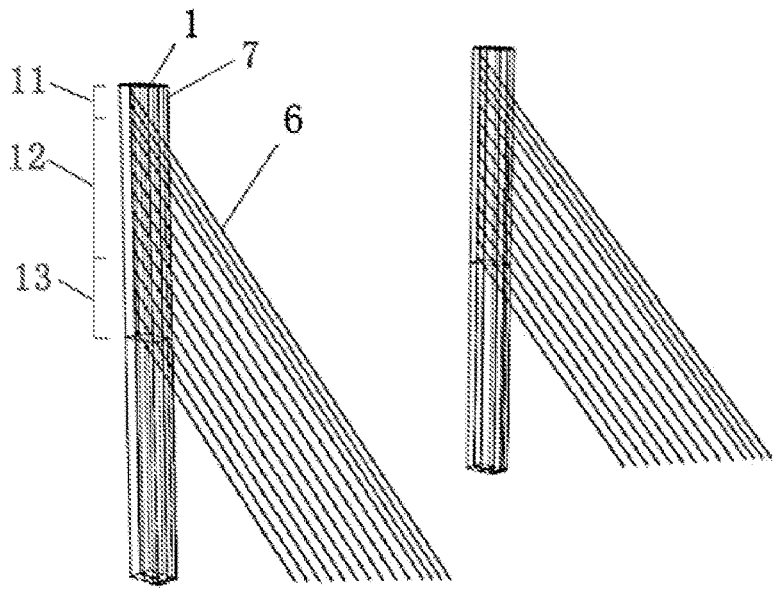
FIG. 4 illustrates a structural schematic diagram of supporting piles and attachments of the supporting piles provided in an embodiment of the disclosure.

As shown in FIG. 4, in the embodiment, the supporting piles 1 are poured with reinforced concrete, and the sectional sizes of the supporting piles 1 are determined based on impact forces of the transverse steel strands applied on the supporting piles.

Specifically, in order to improve the protective effect of the barrier structure of the disclosure, multiple prestressed anchor cables 6 are disposed on each of the supporting piles 1. One end of each of the prestressed anchor cables 6 is fixedly connected to a side wall of a corresponding supporting pile 1 of the supporting piles 1. The other end of each of the prestressed anchor cables 6 is fixed at the lower part of the corresponding mountain. Prestressed anchor cables 6 connected to the corresponding supporting pile 1 are located in a same plane and are perpendicular to the barrier net 2. Each of the supporting piles 1 is provided with vertical reinforcement bars 7, and the vertical reinforcement bars 7 are evenly disposed in the corresponding supporting pile 1 at an equal spacing. By setting the prestressed anchor cables 6 and corresponding vertical reinforcement bars 7, the load-bearing effect of the supporting piles 1 can be improved.

Due to the different load-bearing effects of the supporting piles 1, each of the supporting piles 1 can be divided into upper, middle, and bottom portions 11, 12, and 13. A height ratio of the upper portion 11:the middle portion 12:the bottom portion 13 is (0.8~1.2):(4.8~5.2):(2.8~3.2). A spacing ratio of a spacing of two adjacent prestressed anchor cables 6 of the prestressed anchor cables 6 disposed on the upper portion 11:a spacing of two adjacent prestressed anchor cables 6 of the prestressed anchor cables 6 disposed on the middle portion 12:a spacing of two adjacent prestressed anchor cables 6 of the prestressed anchor cables 6 disposed on the bottom portion 13 is (0.9~1.1):(1.4~1.6):(2.9~3.1).

By designing the spacings between the adjacent prestressed anchor cables 6 on the upper, middle and the bottom portions respectively, the supporting piles 1 of the embodiment achieve better load-bearing effects, so that the barrier structure has a better protective effect. The designs of prestressed anchor cables 6 on the upper, middle, and bottom portions are determined based the finite difference method for elastic foundation beams; since the upper portion 11 is the most unfavorable position for the high-energy impact (in other word, the upper portion 11 is the weakest portion to bear the high-energy impact), the spacing between adjacent prestressed anchor cables 6 on the upper portion 11 is the smallest; the spacing between adjacent prestressed anchor cables 6 on the middle portion 12 is medium; and the spacing between adjacent prestressed anchor cables 6 on the bottom portion 13 is the largest. In a specific embodiment, a total length of each of the supporting piles 1 is 43 m, and 16 prestressed anchor cables 6 are disposed on each of the supporting piles. The height of the upper portion 11 is 2 m, the height of the middle portion 12 is 10 m, and the height of the bottom portion 13 is 6 m. The spacing between adjacent prestressed anchor cables 6 on the upper portion 11 is 1 m, the spacing between adjacent prestressed anchor cables 6 on the middle portion 12 is 1.5 m, and the spacing between adjacent prestressed anchor cables 6 on the bottom portion 13 is 3 m.

Specifically, the prestressed anchor cables 6 are anchored on ground beams, and the ground beams are reversely anchored inside the mountain. A main function of the ground beams is to replace the steel strands after being impacted by the rockfall. Sectional sizes and reinforcement bar configuration of the ground beams are determined based on the calculation of impact load and anchoring force.

The vertical reinforcement bars 7 of the supporting pile 1 is to ensure that the supporting pile 1 has sufficient stability to resist deformation under tension and bending.

When the structure of the supporting pile 1 is designed in the embodiment, a calculation formula of the number of the vertical reinforcement bars 7 is expressed as follows:

$$m \geq \frac{\tau}{f_y B_s (h_0 - a_s')}$$

where in represents the number of the vertical reinforcement bars 7, $\tau$ represents a bending moment of each of the supporting piles 1, $f_y$ represents a yield strength of each of the vertical reinforcement bars 7, $B_s$ represents a sectional area of a single vertical reinforcement bar 7 of the vertical reinforcement bars 7, $h_0$ represents a sectional height of each of the supporting piles 1, and $a_s'$ represents a thickness of a protective layer of each of the supporting piles 1.

The bending moment of each of the supporting piles 1 can be obtained by finite element analysis or a calculation formula, and the calculation formula of the bending moment of each of the supporting piles 1 is expressed as follows:

$$\tau = EI \frac{2x_n - x_{n+1} - x_{n-1}}{h_1^2}$$

each of the supporting piles 1 is divided into n equal parts with a length of $h_1$ from top to bottom, $\tau$ represents the bending moment of each of the supporting piles 1, E represents an elastic modulus of each of the supporting piles 1, I represents a sectional moment of inertia of each of the supporting piles 1, and x represents a horizontal deflection of each of the supporting piles 1.

By presetting the height, flexural stiffness, and deflection of the supporting pile 1, the bending moment of the supporting pile 1 is obtained. Then, based on the bending moment, a sectional height, a thickness of a protective layer, and the yield strength and sectional area of the vertical reinforcement bar 7 of the supporting pile, the minimum number of vertical reinforcement bars 7 of the supporting pile to ensure a predetermined protective effect is obtained. Therefore, the embodiment can meet and achieve the predetermined protective effect when the configuration of the vertical reinforcement bars 7 are determined according to the calculation results.

Figure 5:
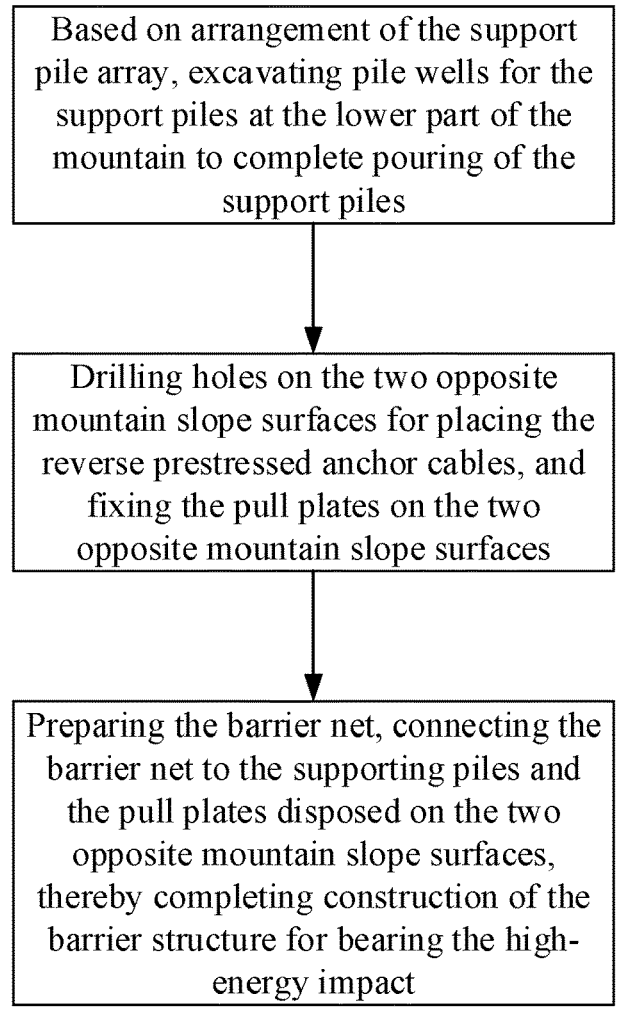
FIG. 5 illustrates a construction method for the barrier structure for bearing the high-energy impact.

As shown in FIG. 5, an embodiment of the disclosure provides a construction method for the barrier structure for bearing the high-energy impact. The construction method includes:

based on arrangement of the support pile array, excavating pile wells for the support piles 1 at the lower part of the mountain to complete pouring of the support piles 1;

drilling holes on the two opposite mountain slope surfaces for placing the reverse prestressed anchor cables 31, and fixing the pull plates 3 on the two opposite mountain slope surfaces; and preparing the barrier net 2, connecting the barrier net 2 to the supporting piles 1 and the pull plates 3 disposed on the two opposite mountain slope surfaces, thereby completing construction of the barrier structure for bearing the high-energy impact.

The barrier structure constructed by the construction method is disposed between two opposite mountain slope surfaces. The barrier structure includes a supporting pile array arranged in a straight line. A barrier net 2 is connected between supporting piles 1. Two sides of the barrier net 2 are fixed on the two mountain slope surfaces through pull plates. A height of the barrier net 2, a yield elongation rate of a material of the barrier net 2, and a fracture elongation rate of the material of the barrier net 2 are set. The barrier net 2 of the disclosure has a higher protective energy level than traditional flexible blocking nets and is easy to maintain. The disclosure is flexible and suitable for the high-energy impact falling from a large height.

While preferred embodiments of the disclosure have been described, those skilled in the art may make additional replacements and modifications to these embodiments based on the creative features of the disclosure. Therefore, the appended claims are intended to include the preferred embodiments and all replacements and modifications falling within the scope of the disclosure. It will be apparent to those skilled in the art that various modifications and replacements can be made in the disclosure without departing from the spirit and scope of the disclosure. Therefore, the disclosure is also intended to include modifications and replacements falling within the scope of the appended claims and their equivalents.

What is claimed is:

1. A barrier structure for bearing a high-energy impact, comprising: a supporting pile array arranged between two opposite mountain slope surfaces; wherein the supporting pile array is arranged in a straight line and comprises two or more supporting piles, and a preset distance between each two adjacent supporting piles of the two or more supporting piles is preset;

the two or more supporting piles are fixed at a lower part of a mountain, a barrier net is connected to the two or more supporting piles, the barrier net passes through the supporting pile array and extends to the two opposite mountain slope surfaces, and the barrier net is fixed on the two opposite mountain slope surfaces;

each of the two opposite mountain slope surfaces is provided with pull plates thereon, one side of each of the pull plates is fixed to a corresponding mountain slope surface of the two opposite mountain slope surfaces through reverse prestressed anchor cables, and the other side of the pull plate is connected to the barrier net for fixing the barrier net;

a height of the barrier net is not less than 6 meters (m), a yield elongation rate of a material of the barrier net is not less than 0.2%, and a fracture elongation rate of the material of the barrier net is not less than 20%;

the barrier net has a grid-like structure comprising transverse steel strands and longitudinal steel strands, the transverse steel strands are connected to the pull plates, a spacing between each two adjacent transverse steel strands of the transverse steel strands is not greater than 0.3 m;

the spacing between each two adjacent transverse steel strands satisfies a following relationship:

$$h \leq n/(\sqrt[3]{V}+1)$$

where h represents the spacing between each two adjacent transverse steel strands, n represents the number of the transverse steel strands, and V represents a volume of a rockfall;

the number of the transverse steel strands satisfies the following relationships:

$$MgH \leq n(W_1+W_2)$$

$$W_1 = F_2 \times L \times \Delta_1 - F_1 \times L \times \Delta_0$$

$$W_2 = F_2 \times L \times (\Delta_2 - \Delta_1)$$

where M represents a mass of the rockfall, H represents a height difference from a position where the rockfall falls to a position of the barrier net where the rockfall collides with the barrier net, $W_1$ represents a work done during an elastic stage of a single transverse steel strand of the transverse steel strands, $W_2$ represents a work done during a plastic stage of the single transverse steel strand, $F_1$ represents a preload applied to the single transverse steel strand, $F_2$ represents a yield critical force of the single transverse steel strand, L represents a length of the single transverse steel strand, $\Delta_0$ represents a preload stretch rate of the single transverse steel strand, $\Delta_1$ represents a yield elongation of the single transverse steel strand, and $\Delta_2$ represents a plastic deformation elongation rate of the single transverse steel strand.

2. The barrier structure for bearing the high-energy impact as claimed in claim 1, wherein a ratio of the number of the reverse prestressed anchor cables connected to each of the pull plates to the number of the transverse steel strands connected to each of the pull plates is not less than 0.3, and a ratio of a height of each of the pull plates above the ground to a height of the pull plate below the ground is not greater than 7.4.

3. The barrier structure for bearing the high-energy impact as claimed in claim 1, wherein at a top of the barrier net, at least two transverse steel strands of the transverse steel strands are bound through T-shaped fasteners to form a top transverse steel strand and fixed to the longitudinal steel strands; at a bottom of the barrier net, at least two transverse steel strands of the transverse steel strands are bound through T-shaped fasteners to form a bottom transverse steel strand and fixed to the longitudinal steel strands; and other transverse steel strands of the barrier net intersect with the longitudinal steel strands one by one to form intersection parts, and each of the intersection parts is fixed through a cross-shaped fastener.

4. The barrier structure for bearing the high-energy impact as claimed in claim 3, wherein one end of each of the T-shaped fasteners is a clamp casing configured to bind the top transverse steel strand or the bottom transverse steel strand; the clamp casing is fixed by bolts located on two sides of the top transverse steel strand or bolts located on two sides of the bottom transverse steel strand; the other end of each of the T-shaped fasteners is a U-shaped fork ear; a front side of the U-shaped fork ear is hinged with the clamp casing, and a rear side of the U-shaped fork ear is fixed to a single longitudinal steel strand of the longitudinal steel strands through a wedge-shaped component; and the wedge-shaped component comprises a locking nut, a pressing nut, a wedge-shaped card, and a wedge-shaped card casing; the wedge-shaped card casing is clamped and fixed with the single longitudinal steel strand; the locking nut and the pressing nut are configured to fix the wedge-shaped card casing and the single longitudinal steel strand, and the wedge-shaped card casing is configured to wrap the wedge-shaped card and clamp the single longitudinal steel strand.

5. The barrier structure for bearing the high-energy impact as claimed in claim 1, wherein each of the supporting piles is provided prestressed anchor cables thereon, one end of each of the prestressed anchor cables is fixedly connected to a side wall of a corresponding supporting pile of the supporting piles, and the other end of each of the prestressed anchor cables is fixed at the lower part of the mountain; and prestressed anchor cables connected to the corresponding supporting pile are located in a same plane and are perpendicular to the barrier net;

each of the supporting piles is provided with vertical reinforcement bars, and the vertical reinforcement bars are evenly disposed in the supporting pile at an equal spacing; and each of the supporting piles comprises an upper portion, a middle portion, and a bottom portion; a height ratio of the upper portion:the middle portion:the bottom portion is (0.8~1.2):(4.8~5.2):(2.8~3.2); a spacing ratio of a spacing of two adjacent prestressed anchor cables of the prestressed anchor cables disposed on the upper portion:a spacing of two adjacent prestressed anchor cables of the prestressed anchor cables disposed on the middle portion:a spacing of two adjacent prestressed anchor cables of the prestressed anchor cables disposed on the bottom portion is (0.9~1.1):(1.4~1.6):(2.9~3.1).

6. The barrier structure for bearing the high-energy impact as claimed in claim 5, wherein a calculation formula of the number of the vertical reinforcement bars is expressed as follows:

$$m \geq \frac{\tau}{f_y B_s (h_0 - a'_s)}$$

where m represents the number of the vertical reinforcement bars, $\tau$ represents a bending moment of each of the supporting piles, $f_y$ represents a yield strength of each of the vertical reinforcement bars, $B_s$ represents a sectional area of a single vertical reinforcement bar of the vertical reinforcement bars, $h_0$ represents a sectional height of each of the supporting piles, and $a'_s$ represents a thickness of a protective layer of each of the supporting piles.

7. The barrier structure for bearing the high-energy impact as claimed in claim 6, wherein a calculation formula of the bending moment of each of the supporting piles is expressed as follows:

$$\tau = EI \frac{2x_n - x_{n+1} - x_{n-1}}{h_1^2}$$

each of the supporting piles is divided into n equal parts with a length of $h_1$ from top to bottom, $\tau$ represents the bending moment of each of the supporting piles, E represents an elastic modulus of each of the supporting piles, I represents a sectional moment of inertia of each of the supporting piles, and x represents a horizontal deflection of each of the supporting piles.

8. A construction method for the barrier structure for bearing the high-energy impact as claimed in claim 1, comprising:

based on arrangement of the support pile array, excavating pile wells for the support piles at the lower part of the mountain to complete pouring of the support piles;

drilling holes on the two opposite mountain slope surfaces for placing the reverse prestressed anchor cables, and fixing the pull plates on the two opposite mountain slope surfaces; and preparing the barrier net, connecting the barrier net to the supporting piles and the pull plates disposed on the two opposite mountain slope surfaces, thereby completing construction of the barrier structure for bearing the high-energy impact.

* * * * *